US010100675B2

(12) United States Patent
Eastwood et al.

(10) Patent No.: US 10,100,675 B2
(45) Date of Patent: Oct. 16, 2018

(54) OUTER DIFFUSER CASE FOR A GAS TURBINE ENGINE

(71) Applicant: United Technologies Corporation, Hartford, CT (US)

(72) Inventors: Jonathan J. Eastwood, Newington, CT (US); Dave J. Hyland, Portland, CT (US); Timothy Dale, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 315 days.

(21) Appl. No.: 14/958,287

(22) Filed: Dec. 3, 2015

(65) Prior Publication Data

US 2016/0160687 A1 Jun. 9, 2016

Related U.S. Application Data

(60) Provisional application No. 62/089,647, filed on Dec. 9, 2014.

(51) Int. Cl.
| | |
|---|---|
| *F01D 25/24* | (2006.01) |
| *F01D 25/34* | (2006.01) |
| *F01D 25/30* | (2006.01) |
| *F01D 9/02* | (2006.01) |
| *F01D 25/26* | (2006.01) |
| *F01D 5/02* | (2006.01) |

(52) U.S. Cl.
CPC ............. *F01D 25/243* (2013.01); *F01D 5/02* (2013.01); *F01D 9/02* (2013.01); *F01D 25/24* (2013.01); *F01D 25/26* (2013.01); *F01D 25/30* (2013.01); *F01D 25/34* (2013.01); *Y02T 50/671* (2013.01)

(58) Field of Classification Search
CPC ...... F01D 25/24; F01D 25/243; F01D 25/246; F01D 25/30; F01D 9/02; F01D 5/02; F05D 2240/128
See application file for complete search history.

(56) References Cited

U.S. PATENT DOCUMENTS

| 5,077,967 A | 1/1992 | Widener et al. |
| 8,443,610 B2 | 5/2013 | Hoke et al. |
| 8,517,666 B2 | 8/2013 | Alvanos et al. |

(Continued)

FOREIGN PATENT DOCUMENTS

WO  WO2014134513 A1  9/2014

OTHER PUBLICATIONS

EP search report for EP15198395.4 dated Jun. 6, 2016.

*Primary Examiner* — Logan Kraft
*Assistant Examiner* — Elton Wong
(74) *Attorney, Agent, or Firm* — O'Shea Getz P.C.

(57) ABSTRACT

An outer diffuser case of a diffuser case assembly for use in a gas turbine engine may have a housing orientated about an engine axis, a forward flange projecting radially outward from the housing, a mid-flange spaced axially aft of the forward flange and projecting radially inward from the housing, and an aft flange projecting radially outward from the housing. The mid flange is spaced axially between the forward and aft flanges and is configured to detachably engage an inner diffuser case of the case assembly. The forward flange is configured to detachably engage a high pressure compressor and the aft flange is configured to detachably engage a high pressure turbine of the engine.

16 Claims, 5 Drawing Sheets

(56) References Cited

U.S. PATENT DOCUMENTS

| | | |
|---|---|---|
| 8,733,078 B2 | 5/2014 | Alholm |
| 8,739,546 B2 | 6/2014 | Snyder et al. |
| 8,800,290 B2 | 8/2014 | Burd et al. |
| 8,935,912 B2 | 1/2015 | Norris et al. |
| 8,966,877 B2 | 3/2015 | McKinney |
| 9,068,515 B2 | 6/2015 | Duong et al. |
| 9,109,537 B2 | 8/2015 | Suciu et al. |
| 9,163,525 B2 | 10/2015 | Alexander et al. |
| 9,188,009 B2 | 11/2015 | Yilmaz et al. |
| 9,194,585 B2 | 11/2015 | Cunha et al. |
| 2006/0013681 A1* | 1/2006 | Cardarella, Jr. ........ F01D 11/02 415/1 |
| 2007/0144177 A1* | 6/2007 | Burd ....................... F01D 9/023 60/752 |
| 2009/0004002 A1 | 1/2009 | Dong et al. |
| 2009/0180864 A1* | 7/2009 | Alvanos ................. F01D 25/24 415/173.1 |
| 2012/0247123 A1* | 10/2012 | Garry ................... F01D 25/243 60/798 |
| 2013/0199205 A1* | 8/2013 | Wang ....................... F02C 6/08 60/785 |
| 2013/0291544 A1* | 11/2013 | Eastwood ................ F23R 3/50 60/734 |
| 2015/0252729 A1 | 9/2015 | Niggemeier et al. |
| 2015/0369487 A1 | 12/2015 | Dierberger |
| 2016/0084501 A1* | 3/2016 | Lunel ....................... F23R 3/50 60/752 |

* cited by examiner

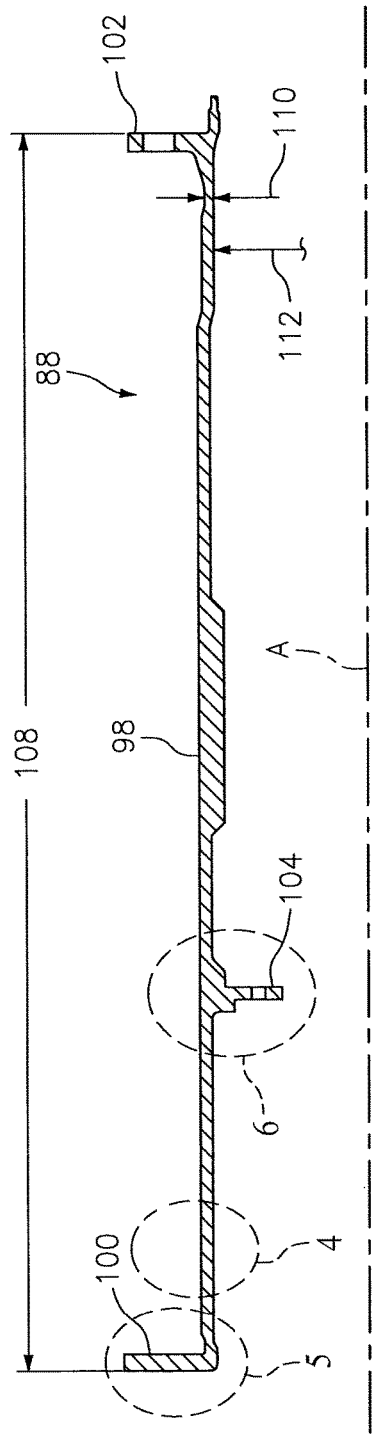
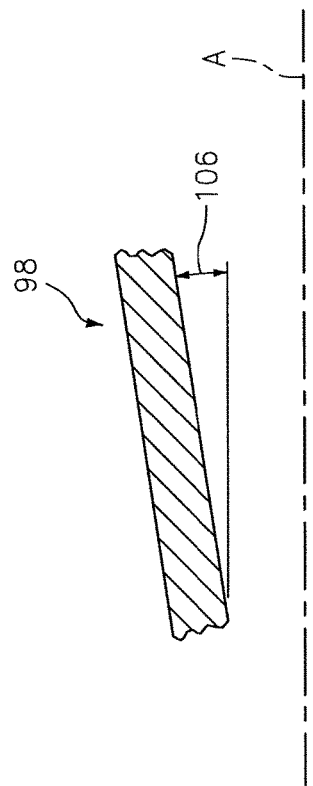
FIG. 3
FIG. 4

OUTER DIFFUSER CASE FOR A GAS TURBINE ENGINE

This application claims priority to U.S. Patent Appln. No. 62/089,647 filed Dec. 9, 2014, which is hereby incorporated by reference.

BACKGROUND

The present disclosure relates to a gas turbine engine, and more particularly, to an outer diffuser case of the turbine engine.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both. The compressed air from the compressor section passes between stator vanes, then through a diffuser section. The diffuser has an expanding cross sectional area in the direction of the airflow to decrease the velocity and increase the static pressure of the air. This prepares the air for entry into a combustion section at low velocity to permit proper mixing with fuel.

The diffuser section has an outer diffuser case that must be structurally sufficient to support surrounding components and withstand the internal dynamics of the operating engine. The design of an outer diffuser case that has a long useful life, can be removed for maintenance, and is light weight, while capable of withstanding internal pressures, temperatures and air flow volumes is desirable.

SUMMARY

An outer diffuser case for use in a gas turbine engine according to one, non-limiting, embodiment of the present disclosure includes a housing orientated about an axis; a forward flange projecting radially outward from the housing and configured to detachably engage a high pressure compressor; an aft flange spaced axially downstream from the forward flange, projecting radially outward from the housing, and configured to detachably engage a high pressure turbine; and a mid-flange spaced axially between the forward and aft flanges and projecting radially inward from the housing, and wherein the mid flange is configured to detachably engage an inner diffuser case.

Additionally to the foregoing embodiment, the housing is cone shaped and diverges in a downstream direction.

In the alternative or additionally thereto, in the foregoing embodiment, the housing diverges by about 2.5 degrees.

In the alternative or additionally thereto, in the foregoing embodiment, the housing has an axial length within a range of about 39.200 to 39.210 cm, and an outer diameter proximate to the forward flange within a range of about 51.864 to 51.890 cm.

In the alternative or additionally thereto, in the foregoing embodiment, the housing has a minimum wall thickness proximate to the aft flange within a range of about 0.305 to 0.330 cm.

In the alternative or additionally thereto, in the foregoing embodiment, the outer diffuser case is made of Inconel 718.

In the alternative or additionally thereto, in the foregoing embodiment, the aft flange carries about 90 circumferentially spaced bolt holes centered to a flange mid-diameter of about 57.823 cm.

In the alternative or additionally thereto, in the foregoing embodiment, the aft flange has a thickness within a range of about 0.610 to 0.762 cm.

In the alternative or additionally thereto, in the foregoing embodiment, the aft flange has an outer diameter within a range of about 59.830 to 59.957 cm.

In the alternative or additionally thereto, in the foregoing embodiment, the forward flange carries about 81 circumferentially spaced bolt holes centered to a flange mid-diameter of about 54.882 cm.

In the alternative or additionally thereto, in the foregoing embodiment, the forward flange has a thickness within a range of about 0.508 to 0.660 cm.

In the alternative or additionally thereto, in the foregoing embodiment, the forward flange has an outer radius within a range of about 28.824 to 28.964 cm.

In the alternative or additionally thereto, in the foregoing embodiment, the housing includes a rearward projecting, annular, lip disposed downstream of the aft flange.

In the alternative or additionally thereto, in the foregoing embodiment, the lip has a base portion and a reinforcement portion projecting radially outward from the base portion and directly adjacent to the aft flange.

In the alternative or additionally thereto, in the foregoing embodiment, the base portion includes a distal end that project axially rearward further than the reinforcement portion, the base portion has an outer diameter within a range of about 54.562 to 54.587 cm, and the reinforcement portion projects axially rearward from the aft flange by a distance within a range of about 0.749 to 0.775 cm and has an outer diameter with a range of about 54.747 to 54.757 cm.

An outer diffuser case for use in a gas turbine engine according to another, non-limiting, embodiment includes a cone-shaped housing orientated about an axis, the housing including a lip; and an aft flange projecting radially outward from the housing, and configured to detachably engage a high pressure turbine, wherein the lip generally projects rearward from the aft flange.

Additionally to the foregoing embodiment, the lip has a base portion and a reinforcement portion projecting radially outward from the base portion and directly adjacent to the aft flange.

In the alternative or additionally thereto, in the foregoing embodiment, the base portion includes a distal end that project axially rearward further than the reinforcement portion, the base portion has an outer diameter within a range of about 54.562 to 54.587 cm, and the reinforcement portion projects axially rearward from the aft flange by a distance within a range of about 0.749 to 0.775 cm and has an outer diameter with a range of about 54.747 to 54.757 cm.

In the alternative or additionally thereto, in the foregoing embodiment, the housing diverges in a downstream direction at an angle of about 2.5 degrees.

In the alternative or additionally thereto, in the foregoing embodiment, the outer diffuser case includes a forward flange projecting radially outward from the housing and configured to detachably engage a high pressure compressor; and wherein the housing has an axial length within a range of about 39.200 to 39.210 cm, an outer diameter proximate to the forward flange within a range of about 51.864 to 51.890 cm, and a minimum wall thickness proximate to the aft flange within a range of about 0.305 to 0.330 cm.

The foregoing features and elements may be combined in various combinations without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 3 is a cross section of an outer diffuser case of the diffuser case assembly;

FIG. 4 is a partial, enlarged, cross section of a housing of the outer diffuser case taken from circle 4 of FIG. 3;

DETAILED DESCRIPTION

Figure 1:
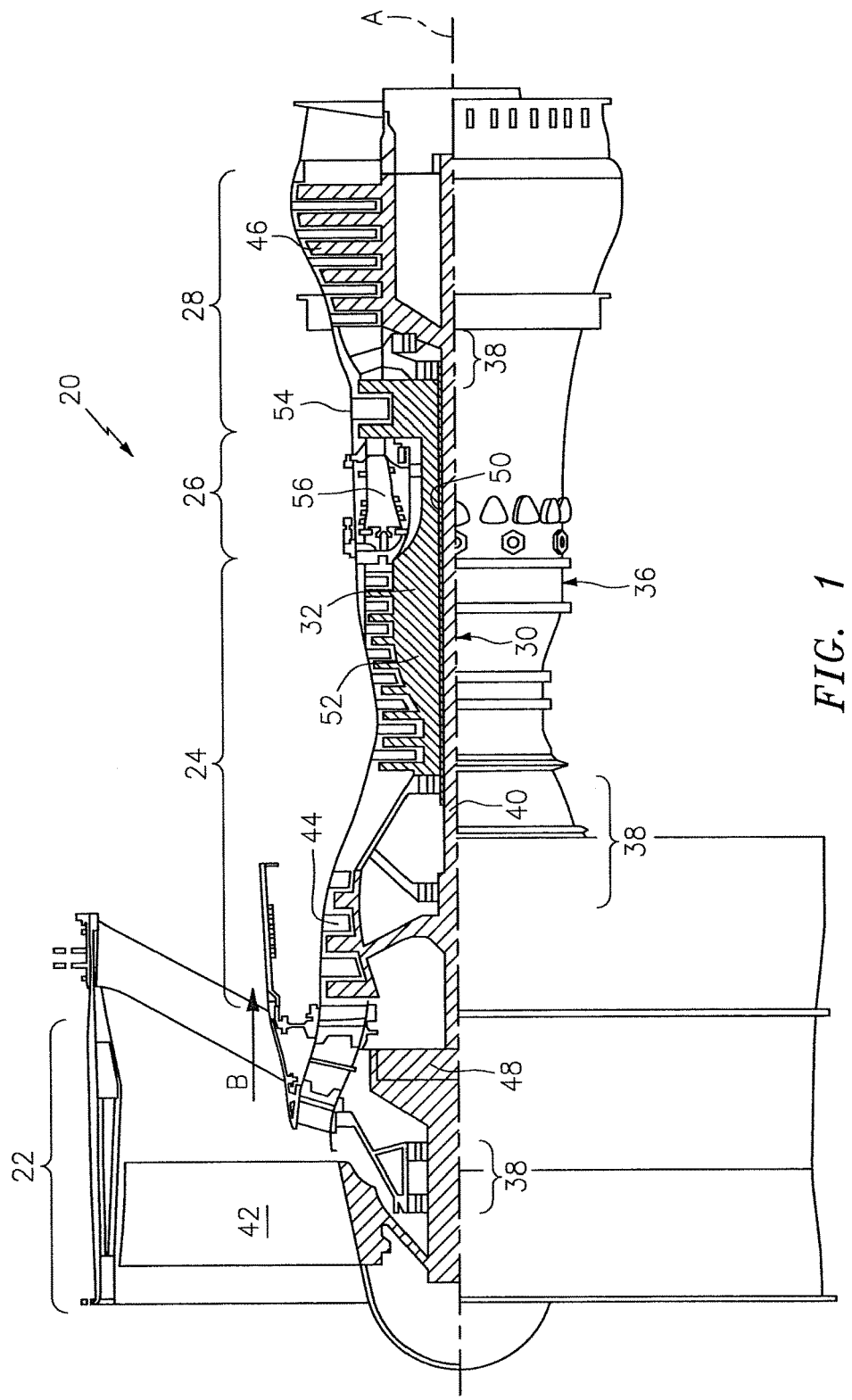
FIG. 1 is a schematic cross section of an exemplary gas turbine engine.

FIG. 1 schematically illustrates a gas turbine engine 20 disclosed as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26, then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool (plus fan) turbofans with an intermediate spool.

The engine 20 generally includes a low spool 30 and a high spool 32 mounted for rotation about a central, longitudinal, engine axis A relative to an engine static structure 36 or engine case via several bearing structures 38. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and high pressure turbine 54 ("HPT") of the turbine section 28. A combustor 56 of the combustor section 26 is arranged between the HPC 52 and the HPT 54.

The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,688 meters). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $(T/518.7)^{0.5}$, where "T" represents the ambient temperature in degrees Rankine The Low Corrected Fan Tip Speed according to one non-limiting embodiment of the example gas turbine engine 20 is less than about 1,150 feet per second (351 meters per second).

Figure 2:
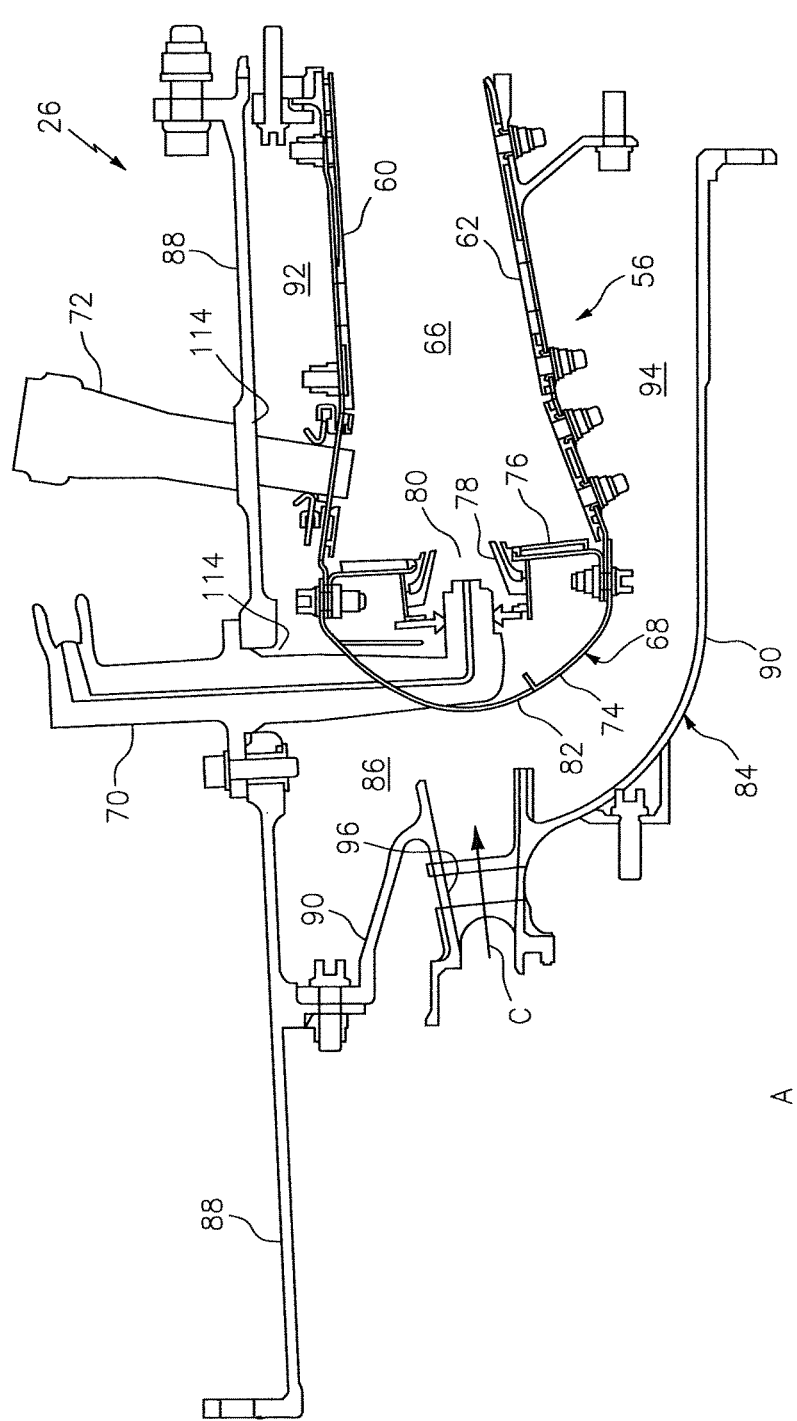
FIG. 2 is a partial cross section of a diffuser case assembly and combustor of the gas turbine engine.

Referring to FIG. 2, the combustor 56 may be annular and generally includes an outer combustor wall 60 and an inner combustor wall 62. The outer combustor wall 60 and the inner combustor wall 62 are spaced apart radially with respect to axis A and such that a combustion chamber 66 is generally defined therebetween. The combustion chamber 66 is generally annular in shape. Although not illustrated, each combustor wall 60, 62 generally includes a respective support shell that supports one or more liners mounted to a hot side of the respective support shell. The liners directly define the combustion chamber 66 that contains the flow of combustion products for driving the turbine section 28. The liners are often comprised of a plurality of Impingement Film Float (IFF) wall panels orientated in a generally rectilinear liner array. Each panel may be manufactured of, for example, a nickel based super alloy, ceramic or other temperature resistant material.

The combustor 56 further includes a forward assembly 68, a plurality of circumferentially spaced fuel nozzles 70 (one shown) and at least one igniter 72. The forward assembly 68 is immediately located downstream of the compressor section 24 to receive compressed airflow therefrom, and may include an annular hood 74, a bulkhead 76 that defines in-part the combustion chamber 66, and a plurality of fuel nozzle guides 78 (one shown) that generally define an opening 80 in direct fluid communication with the combustion chamber 66. A plurality of circumferentially spaced ports 82 in the hood 74 are each circumferentially aligned with a respective fuel nozzle guide 78 or opening 80. Each fuel nozzle 70 projects in a downstream direction through the respective port 82 and through the bulkhead assembly 76 via the opening 80. The bulkhead 76 spans radially and secures to the outer and inner walls 60, 62.

An annular diffuser case assembly 84 generally surrounds and extends forward (i.e. upstream) of the combustor 56 with an annular air plenum 86 defined between the case assembly 84, and the hood 74 and outer and inner walls 60, 62 of the combustor 56. The diffuser case assembly 84 has an annular outer diffuser case 88 and an annular inner diffuser case 90. The outer diffuser case 88 is generally, spaced radially outward from the outer wall 60 of the combustor 56 and may project forward (i.e. upstream) therefrom. The inner diffuser case 90 is, in-part, spaced radially inward from the inner wall 62 of the combustor 56 and further projects forward and radially outward to engage the outer diffuser case 88. An outward portion 92 of the air plenum 86 is generally defined radially between the outer wall 60 of the combustor 56 and the outer diffuser case 88. Similarly, an inner portion 94 of the air plenum 86 is generally defined radially between the inner wall 62 of the combustor 56 and the inner diffuser case 90.

The diffuser case assembly 84 is configured to deliver a flow of compressed air (see arrow C) through an annular diffuser nozzle 96 supported by the inner diffuse case 90, and into the air plenum 86. From the air plenum 86 the compressed air C is generally divided with a portion flowing through the forward assembly 68 and into the combustion chamber 66 where the air is mixed with fuel flowing from the nozzles 70 and combusted. Other portions of the compressed air flow into the outer and inner portions 92, 94 of the air plenum 86 where the air is used to cool surrounding components. For instance, and although not illustrated, cooling air may flow from the outer and inner plenum portions 92, 94, through impingement holes in the respective outer and inner walls 60, 62, and through effusion holes in the same walls to create a film of cooling air over the walls and in the combustion chamber 66. Air from the same plenum portions may also flow through dilution holes in the respective walls (not shown) to further assist combustion and control temperature profiles of hot combustion gases at an exit of the combustion chamber.

Referring to FIGS. 2 and 3, the outer diffuser case 88 of the case assembly 84 may include a housing 98 concentrically located about axis A, a forward and aft flanges 100, 102 projecting radially outward from the housing 98, and a mid-flange 104 projecting radially inward for engagement to the inner diffuser case 90. The flanges 100, 102, 104 may be annular in shape and circumferentially continuous, with the forward flange 100 located axially upstream of the mid-flange 104, and the mid-flange 104 located axially upstream of the aft flange 102. The forward flange 100 may be detachably connected to the HPC 52, the aft flange 102 may be detachably connected to the HPT 54, and the mid-flange 104 detachably connected to the inner diffuser case 90. The case assembly 84 may be made of Inconel 718 that is capable of withstanding the higher pressures and temperatures of more current turbine engines such as the geared gas turbine engine 20 previously described. The forward flange 100 may further have scallops along its peripheral edge for weight and flange life-span benefits (not illustrated but generally known to one skilled in the art).

Referring to FIGS. 2 through 4, the housing 98 may generally be conical and diverges in a downstream direction by an angle (see arrow 106 in FIG. 4), with respect to axis A, of about 2.5 degrees. The housing 98 may further have an axial length (see arrow 108 in FIG. 3) that includes the thickness of the flanges 100, 102 that falls within a range of about 39.200 to 39.210 cm (15.433 to 15.437 inches) and a minimum wall thickness (see arrow 110 in FIG. 3) between a range of about 0.305 to 0.330 cm (0.120 to 0.130 inches) and preferably about 0.318 cm (0.125 inches) proximate to, and upstream of, the aft flange 102. At the minimum wall thickness location, the housing 98 may generally have an inner diameter (see arrow 112) within a range of about 54.199 to 54.224 cm (21.338 to 21.348 inches). Spaced upstream of the minimum wall thickness location, the housing 98 has a plurality of apertures 114 through which the plurality of fuel nozzles 70 and the at least one igniter 72 of the combustor section 26 project radially outward. Because the fuel nozzles 70 and igniter 72 may be connected to and supported by the housing 98, the dimensions and material composition of the housing 98 is designed to structurally support these components and others, and withstand internal pressures, temperatures, and air flow volumes unique to more current engines such as the geared gas turbine engine, while minimizing weight and unnecessary manufacturing and maintenance costs.

Figure 5:
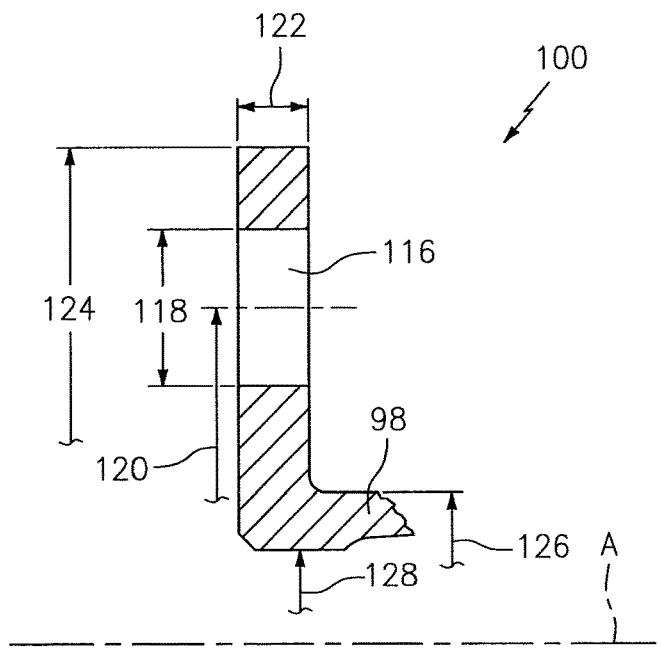
FIG. 5 is an enlarged cross section of a forward flange of the outer diffuser case taken from circle 5 of FIG. 3.

Referring to FIGS. 2 and 5, the forward flange 100 of the outer diffuser case 88 may have about eighty-one fastener or bolt holes 116 each having a diameter (see arrow 118 in FIG. 5) within a range of about 1.019 to 1.044 cm (0.401 to 0.411 inches) for receipt of bolts (not shown) to connect the flange 100 to the HPC 52. Each hole 116 may be radially centered to the flange 100 along a flange diameter (see arrow 120) of about 54.882 cm (21.607 inches). The flange 100 may further have a thickness (see arrow 122) within a range of about 0.508 to 0.660 cm (0.200 to 0.260 inches) and an outer radius (see arrow 124) within a range of about 28.824 to 28.964 cm (11.348 to 11.403 inches). The flange 100 may project radially outward from the housing 98 at a location where a housing outer diameter (see arrow 126) is within a range of about 51.864 to 51.890 cm (20.419 to 20.429 inches), and an inner diameter (see arrow 128) is within a range of about 51.024 to 51.034 cm (20.088 to 20.092 inches). Because the housing 98 is connected to and supported in-part by the forward flange 100, the dimensions and material composition of the flange is designed to structurally support at least the housing 98, and withstand internal pressures, temperatures, and air flow volumes unique to more current engines such as the geared gas turbine engine, while minimizing weight and unnecessary manufacturing and maintenance costs.

Figure 6:
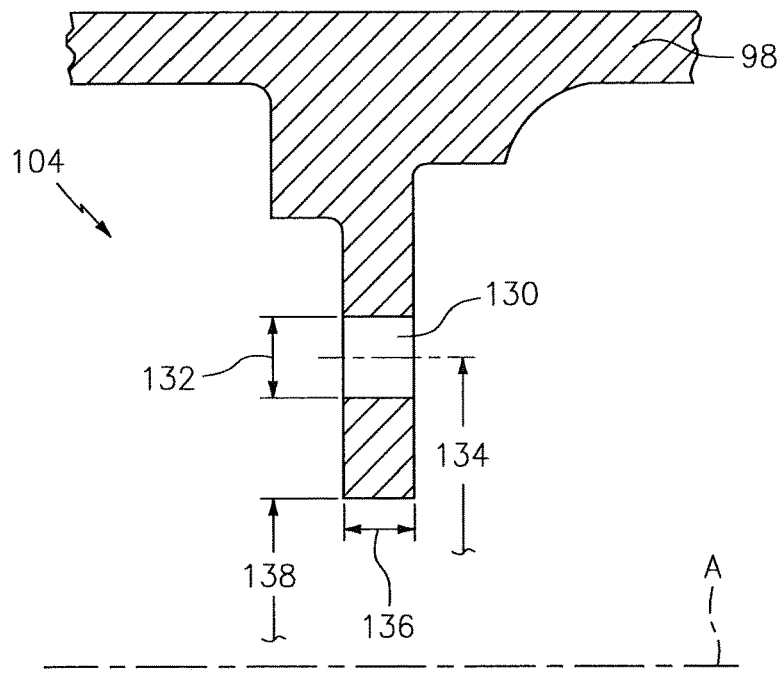
FIG. 6 is an enlarged cross section of a mid-flange of the outer diffuser case taken from circle 6 of FIG. 3.

Referring to FIGS. 2 and 6, the mid-flange 104 of the outer diffuser case 88 may have about sixty fastener or bolt holes 130 each having a diameter (see arrow 132) within a range of about 0.782 to 0.792 cm (0.308 to 0.312 inches) for receipt of bolts (not shown) to detachably connect the flange 104 to the inner diffuser case 90. Each hole 130 may be radially centered to the flange 104 along a flange diameter (see arrow 134) of about 49.327 cm (19.420 inches). The flange 104 may further have a thickness (see arrow 136)

within a range of about 0.368 to 0.521 cm (0.145 to 0.205 inches) and an inner, distal, radius (see arrow 138) within a range of about 47.600 to 47.777 cm (18.740 to 18.810 inches). Because the inner diffuser case 90 is connected to and supported in-part by the mid-flange 104, the dimensions and material composition of the flange are designed to structurally support at least the inner diffuser case 90, and withstand internal pressures, temperatures, and air flow volumes unique to more current engines such as the geared gas turbine engine, while minimizing weight and unnecessary manufacturing and maintenance costs.

Figure 7:
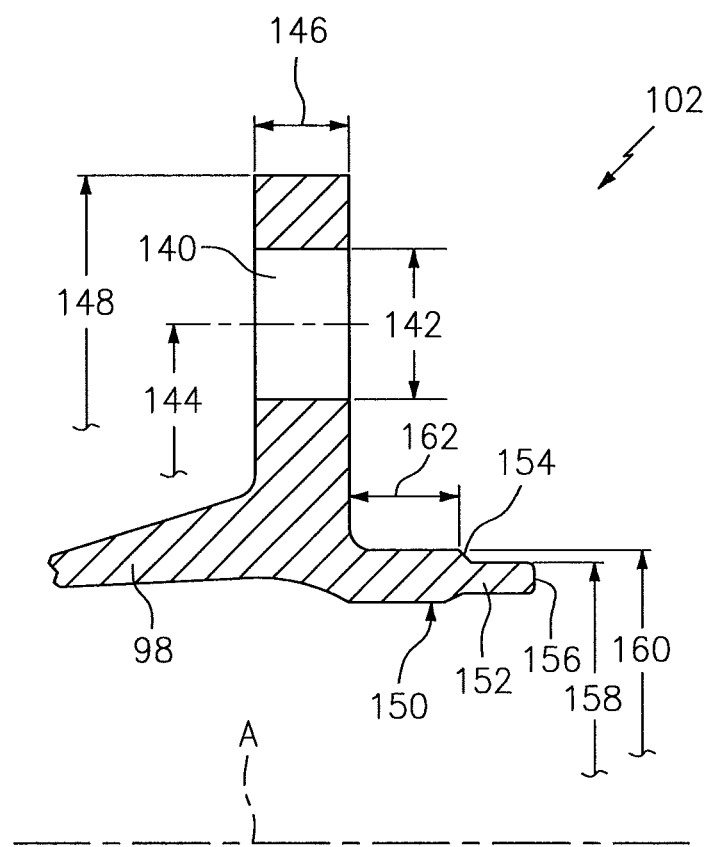
FIG. 7 is an enlarged cross section of an aft flange of the outer diffuser case taken from circle 7 of FIG. 3.

Referring to FIGS. 2 and 7, the aft flange 102 of the outer diffuser case 88 may have about ninety fastener or bolt holes 140 each having a diameter (see arrow 142) within a range of about 1.019 to 1.044 cm (0.401 to 0.411 inches) for receipt of bolts (not shown) to connect the flange 102 to the HPT 54. Each hole 140 may be radially centered to the flange 102 along a flange diameter (see arrow 144) of about 57.823 cm (22.765 inches). The flange 102 may further have a thickness (see arrow 146) within a range of about 0.610 to 0.762 cm (0.240 to 0.300 inches) and an outer radius (see arrow 148) within a range of about 59.830 to 59.957 cm (23.555 to 23.605 inches). Because the housing 98 is connected to and supported in-part by the aft flange 102, the dimensions and material composition of the flange is designed to structurally support at least the housing 98, and withstand internal pressures temperatures, and air flow volumes unique to more current engines such as the geared gas turbine engine, while minimizing weight and unnecessary manufacturing and maintenance costs.

Generally projecting rearward (i.e. downstream) from the aft flange 102 is a lip 150 of the housing 98 that may be circumferentially continuous. The lip 150 may have a ring-shaped base portion 152 and a reinforcement portion 154. The base portion 152 projects axially rearward to a distal end 156 of portion 152 and may project further than the reinforcement portion 154. Proximate to the distal end 156, the base portion 152 has an outer diameter (see arrow 158) within a range of about 54.562 to 54.587 cm (21.481 to 21.491 inches). The reinforcement portion 154 projects radially outward from the base portion 152 having an outer diameter (see arrow 160) within a range of about 54.747 to 54.757 cm (21.554 to 21.558 inches) and axially rearward from the aft flange 102 by an axial distance (see arrow 162) within a range of about 0.749 to 0.775 cm (0.295 to 0.305 inches). The lip 150 is generally a landing that provides a snap fit interface to the first stage vane support of the HPT 54.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

The invention claimed is:

1. An outer diffuser case for use in a gas turbine engine, the outer diffuser case comprising:
a housing orientated about an axis;
a forward flange projecting radially outward from the housing and configured to detachably engage a high pressure compressor;
an aft flange spaced axially downstream from the forward flange, projecting radially outward from the housing, and configured to detachably engage a high pressure turbine; and
a mid-flange spaced axially between the forward and aft flanges and projecting radially inward from the housing, and wherein the mid flange is configured to detachably engage an inner diffuser case;
wherein the housing has an axial length within a range of 39.200 to 39.210 cm, and an outer diameter proximate to the forward flange within a range of 51.864 to 51.890 cm.

2. The outer diffuser case set forth in claim 1, wherein the housing is cone shaped and diverges in a downstream direction, increasing in diameter from an upstream end to a downstream end.

3. The outer diffuser case set forth in claim 2, wherein the housing diverges in the downstream direction by about 2.5 degrees with respect to the axis.

4. The outer diffuser case set forth in claim 1, wherein the housing has a minimum wall thickness proximate to the aft flange within a range of 0.305 to 0.330 cm.

5. The outer diffuser ease set forth in claim 1, wherein the aft flange carries ninety circumferentially spaced bolt holes, and each of the spaced bolt holes has a center positioned at a distance of about 28.912 cm from the axis.

6. The outer diffuser case set forth in claim 1, wherein the forward flange carries 81 circumferentially spaced bolt holes, and each of the spaced bolt holes has a center positioned at a distance of about 27.441 cm from the axis.

7. The outer diffuser case set forth in claim 1, wherein the housing includes a rearward projecting, annular, lip disposed downstream of the aft flange.

8. The outer diffuser case set forth in claim 7, wherein the lip has a base portion and a reinforcement portion projecting radially outward from the base portion and directly adjacent to the aft flange.

9. An outer diffuser case for use in a gas turbine engine, the outer diffuser case comprising:
a housing orientated about an axis;
a forward flange projecting radially outward from the housing and configured to detachably engage a high pressure compressor;
an aft flange spaced axially downstream from the forward flange, projecting radially outward from the housing, and configured to detachably engage a high pressure turbine; and
a mid-flange spaced axially between the forward and aft flanges and projecting radially inward from the housing, and wherein the mid flange is configured to detachably engage an inner diffuser case;
wherein the aft flange carries ninety circumferentially spaced bolt holes, and each of the spaced bolt holes has a center positioned at a distance of about 28.912 cm from the axis; and
wherein the aft flange has a thickness within a range of 0.610 to 0.762 cm.

10. An outer diffuser case for use in a gas turbine engine, the outer diffuser case comprising:
a housing orientated about an axis;
a forward flange projecting radially outward from the housing and configured to detachably engage a high pressure compressor;
an aft flange spaced axially downstream from the forward flange, projecting radially outward from the housing, and configured to detachably engage a high pressure turbine; and a mid-flange spaced axially between the forward and aft flanges and projecting radially inward from the housing, and wherein the mid flange is configured to detachably engage an inner diffuser case;

wherein the aft flange carries ninety circumferentially spaced bolt holes, and each of the spaced bolt holes has a center positioned at a distance of about 28.912 cm from the axis; and wherein the aft flange has an outer diameter within a range of 59.830 to 59.957 cm.

11. An outer diffuser case for use in a gas turbine engine, the outer diffuser case comprising:

a housing orientated about an axis;

a forward flange projecting radially outward from the housing and configured to detachably engage a high pressure compressor;

an aft flange spaced axially downstream from the forward flange, projecting radially outward from the housing, and configured to detachably engage a high pressure turbine; and a mid-flange spaced axially between the forward and aft flanges and projecting radially inward from the housing, and wherein the mid flange is configured to detachably engage an inner diffuser case;

wherein the forward flange carries 81 circumferentially spaced bolt holes, and each of the spaced bolt holes has a center positioned at a distance of about 27.441 cm from the axis; and wherein the forward flange has a thickness within a range of 0.508 to 0.660 cm.

12. An outer diffusser case for use in a gas turbine engine, the outer diffuser case comprising:

a housing orientated about an axis;

a forward flange projecting radially outward from the housing and configured to detachably engage a high pressure compressor;

an aft flange spaced axially downstream from the forward flange, projecting radially outward from the housing, and configured to detachably engage a high pressure turbine; and a mid-flange spaced axially between the forward and aft flanges and projecting radially inward from the housing, and wherein the mid flange is configured to detachably engage an inner diffuser case;

wherein the forward flange carries 81 circumferentially spaced bolt holes, and each of the spaced bolt holes has a center positioned at a distance of about 27.441 cm from the axis; and wherein the forward flange has an outer diameter within a range of 28.824 to 28.964 cm.

13. An outer diffuser case for use in a gas turbine engine, the outer diffuser case comprising:

a housing orientated about an axis;

a forward flange projecting radially outward from the housing and configured to detachably engage a high pressure compressor;

an aft flange spaced axially downstream from the forward flange, projecting radially outward from the housing, and configured to detachably engage a high pressure turbine; and a mid-flange spaced axially between the forward and the aft flanges and projecting radially inward the housing, and wherein the mid flange is configured to detachably engage an inner diffuser case;

wherein the housing includes a rearward projecting, annular, lip disposed downstream of the aft flange;

wherein the lip has a base portion and a reinforcement portion projecting radially outward from the base portion and directly adjacent to the aft flange; and wherein the base portion includes a distal end that projects axially rearward further than the reinforcement portion, the base portion has an outer diameter within a range of 54.562 to 54.587 cm, and the reinforcement portion projects axially rearward from the aft flange by a distance within a range of 0.749 to 0.775 cm and has an outer diameter with a range of 54.747 to 54.757 cm.

14. An outer diffuser case for use in a gas turbine engine, the outer diffuser case comprising:

a cone-shaped housing orientated about an axis, the housing including a lip; and an aft flange projecting radially outward from the housing, and configured to detachably engage a high pressure turbine, wherein the lip generally projects rearward from the aft flange;

wherein the lip has a base portion and a reinforcement portion projecting radially outward from the base portion and directly adjacent to the aft flange; and wherein the base portion includes a dital end that projects axially rearward further than the reinforcement portion, the base portion has an outer diameter within a range of 54.562 to 54.587 cm, and the reinforcement portion projects axially rearward from the aft flange by a distance within a range of 0.749 to 0.775 cm and has an outer diameter with a range of 54.747 to 54.757 cm.

15. The outer diffuser case set forth in claim 14, wherein the housing diverges in a downstream direction, increasing in diameter from an upstream end to a downstream end, at an angle of about 2.5 degrees with respect to the axis.

16. An outer diffuser case for use in a gas turbine engine, the outer diffuser case comprising:

a cone-shaped housing orientated about an axis, the housing including a lip;

an aft flange projecting radially outward from the housing, and configured to detachably engage a high pressure turbine, wherein the lip generally projects rearward from the aft flange; and a forward flange projecting radially outward from the housing and configured to detachably engage a high pressure compressor;

wherein the housing has an axial length within a range of 39.200 to 39.210 cm, an outer diameter proximate to the forward flange within a range of 51.864 to 51.890 cm, and a minimum wall thickness proximate to the aft flange within a range of about 0.305 to 0.330 cm.

\* \* \* \* \*